March 25, 1947.  H. A. TEALE  2,417,958
APPARATUS FOR REDUCING THE FLUID CONTENT OF A FLUID-SOLID INTERMIXTURE
Filed Dec. 21, 1944  5 Sheets-Sheet 5
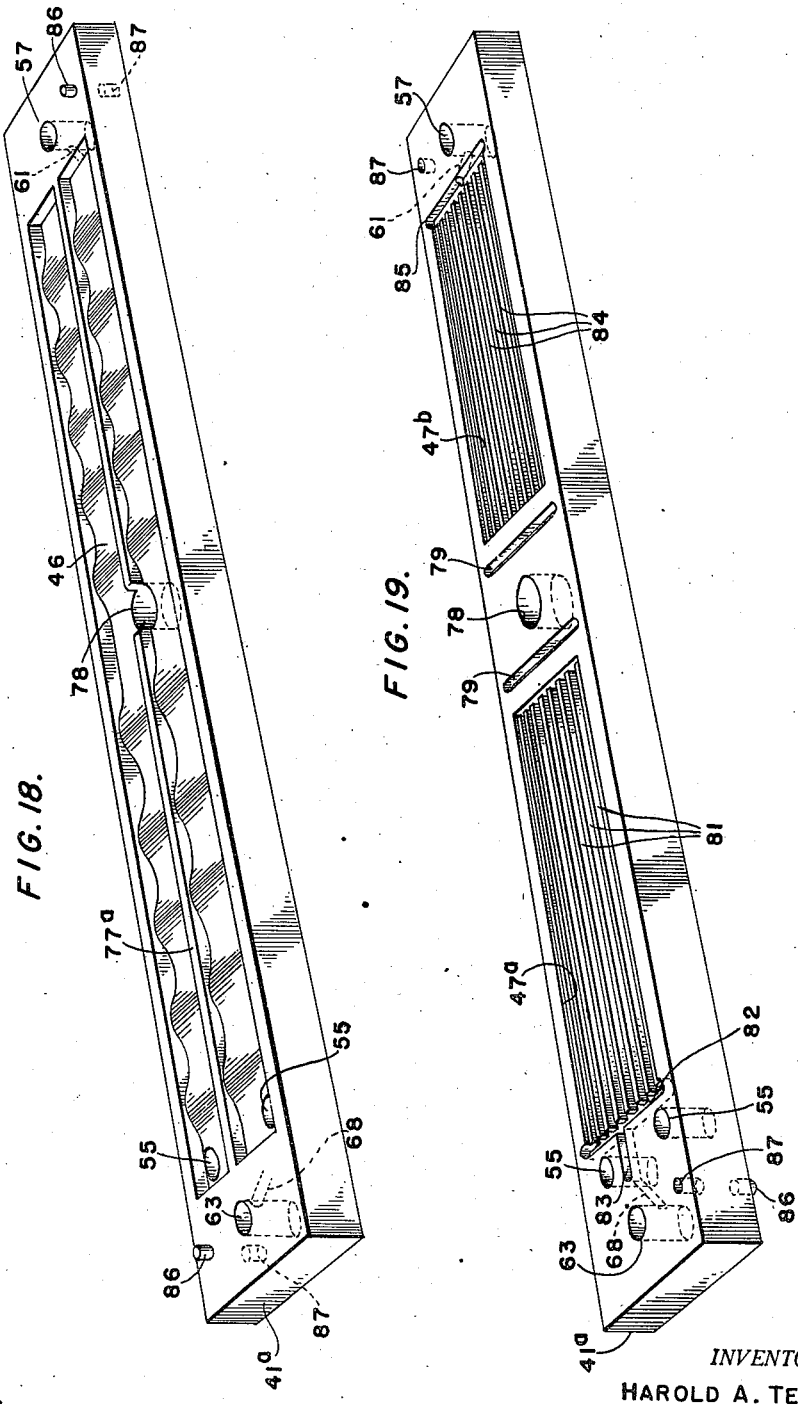
INVENTOR:
HAROLD A. TEALE,
BY
ATTORNEY Patented Mar. 25, 1947

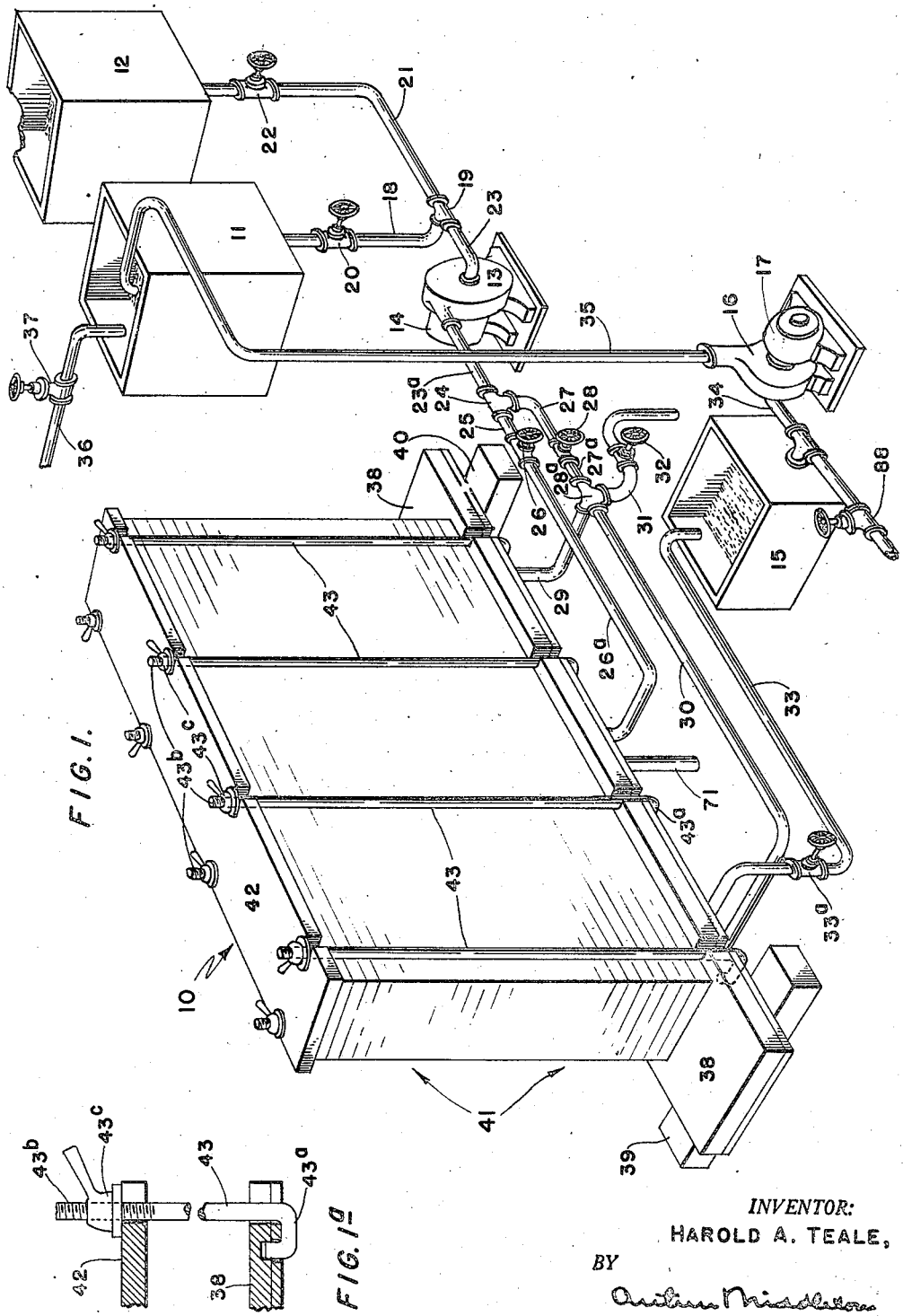

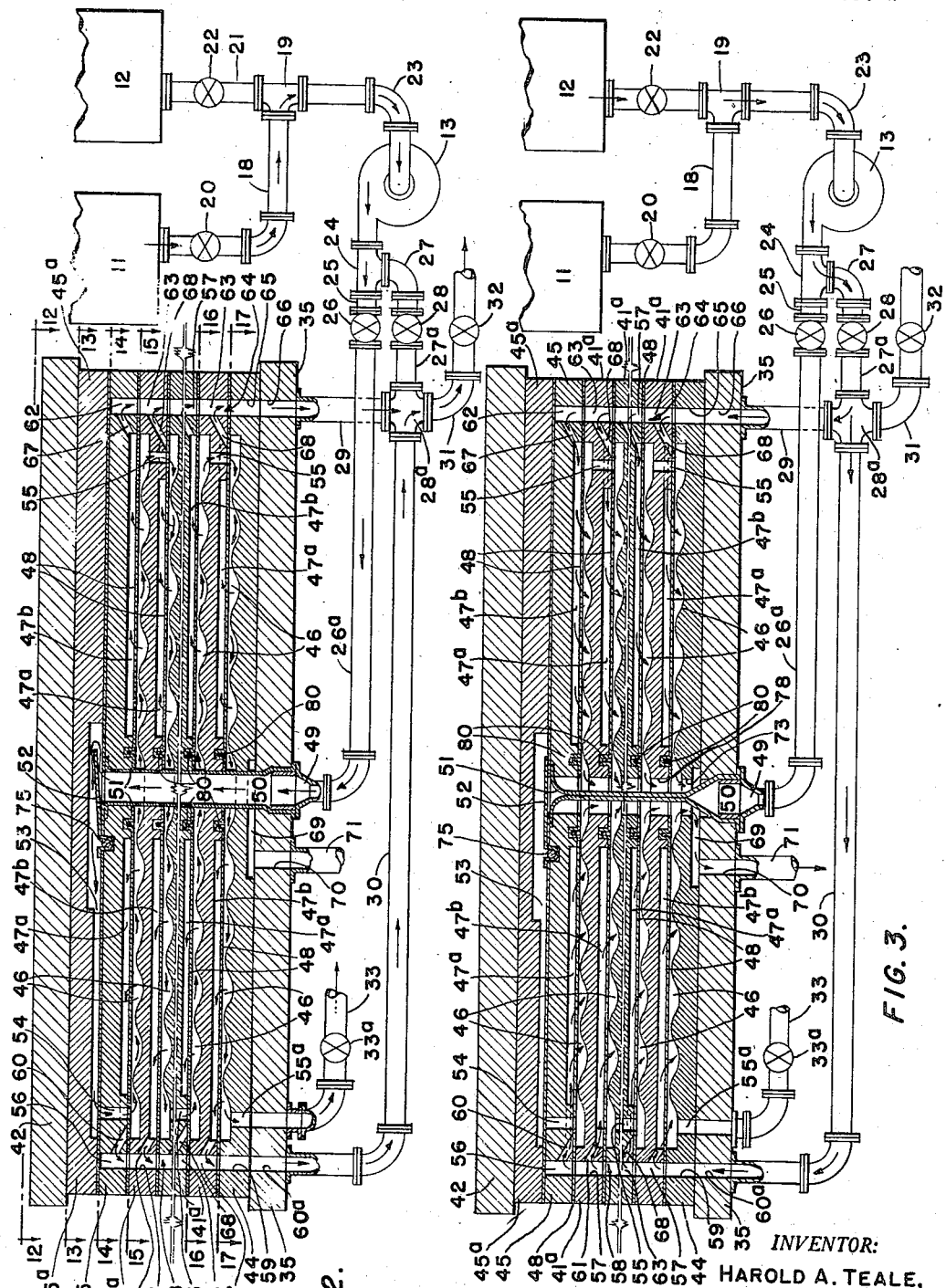

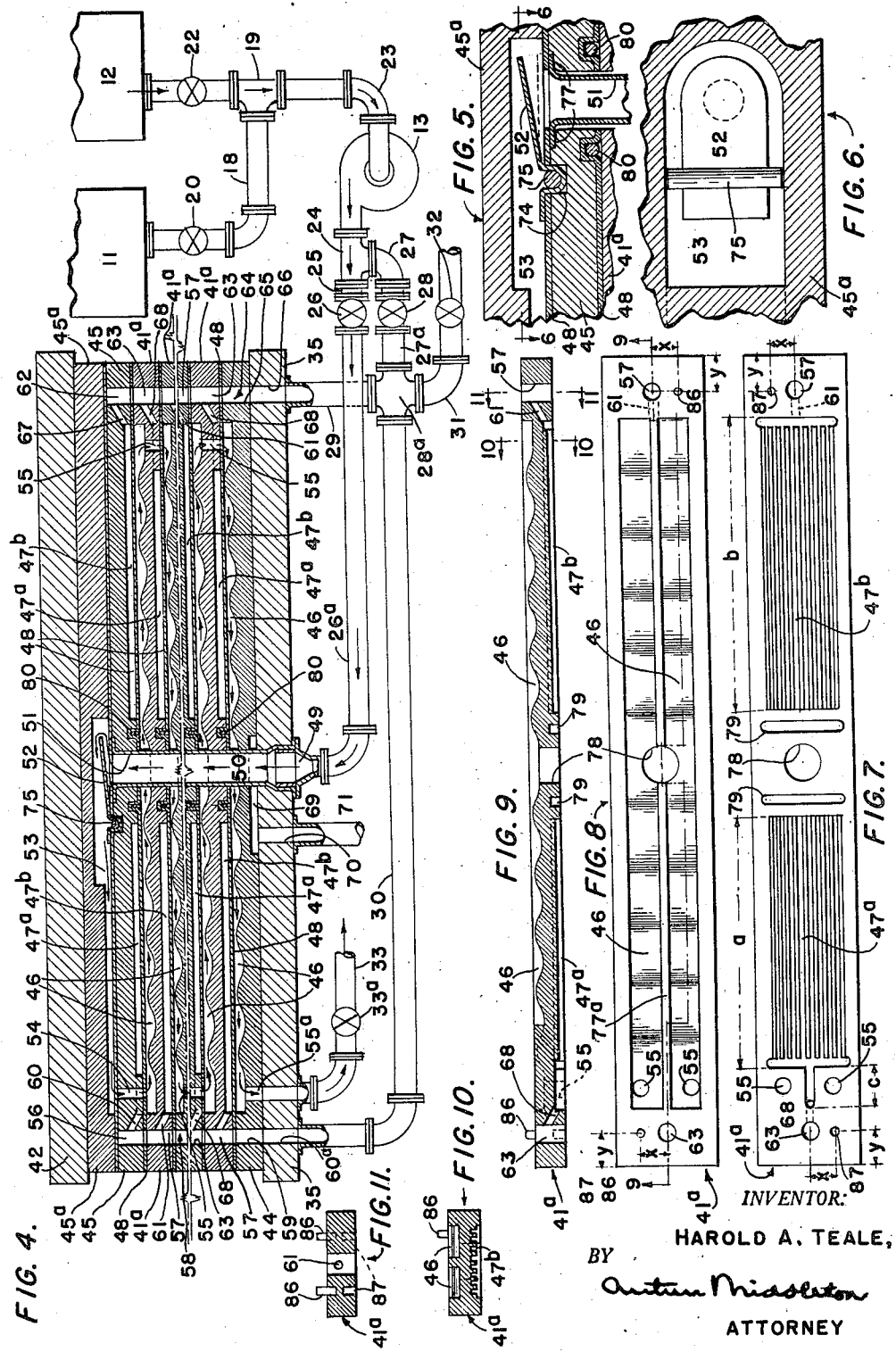

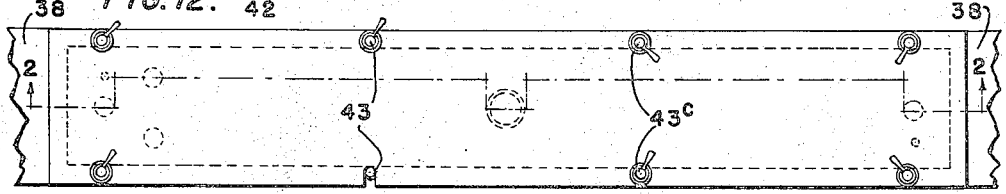
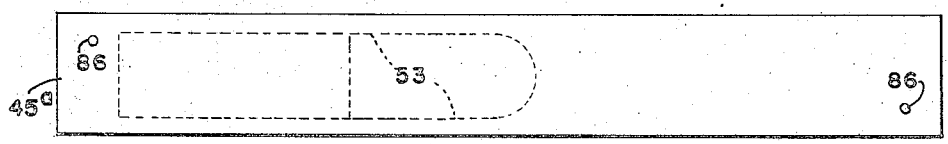
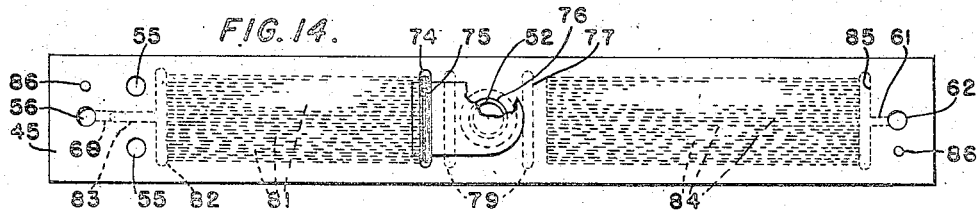
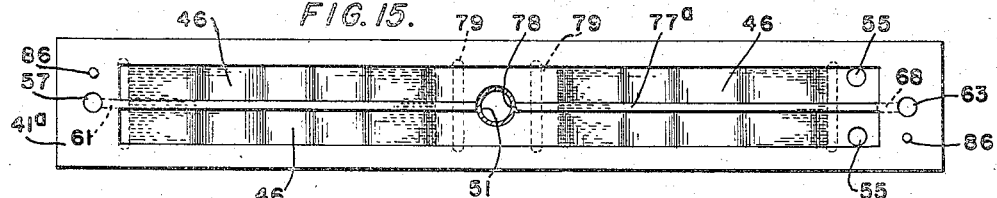
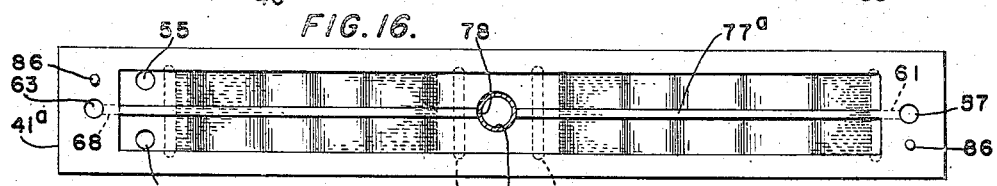
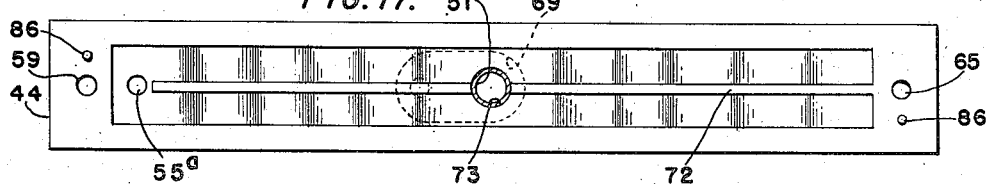

2,417,958

UNITED STATES PATENT OFFICE 2,417,958

APPARATUS FOR REDUCING THE FLUID CONTENT OF A FLUID-SOLID INTERMIXTURE

Harold A. Teale, Brooklyn, N. Y., assignor to Filter Media Corporation, Irvington - on - Hudson, N. Y., a corporation of New York Application December 21, 1944, Serial No. 569,140

5 Claims. (Cl. 210—188)

This invention relates to slurry thickeners or de-waterers for reducing the liquid content of a solids mixture or slurry by filtration. More specifically, this relates to apparatus comprising a plane filter medium separating a slurry chamber from a filtrate chamber, in which the slurry in passing along the filter medium has some of its liquid abstracted through the medium and withdrawn from the filtrate chamber. Further particularized, this relates to means for maintaining the filter medium of such an apparatus free of undesirable solids accumulations.

A plurality of such filter media parallel to one another and each embodied in a so-called filter plate may be assembled or stacked into an apparatus unit so that the slurry may pass along the surfaces of a succession of superposed filter media while the abstracted liquid is being withdrawn from each of the filtrate chambers. That side of a filter medium that faces the slurry chamber will herein be termed the slurry side or surface, while the opposite side facing the filtrate chamber will be termed the filtrate side or surface.

An example of a de-watering unit of this kind appears in my copending patent application Serial No. 498,520, filed August 13, 1943. Such an apparatus is shown to comprise a stack of horizontal filter plates through which stack the slurry passes in a general downward direction, although in zig-zag fashion from one filter medium to the next; that is, the slurry reverses its horizontal flow direction each time it passes from the end of one filter medium to the beginning of the next. In the operation of this kind of an apparatus a single passage of the slurry through the unit may suffice to abstract the desired quantity of liquid, although the slurry may also be passed repeatedly or recirculated through the unit until a desired degree of de-watering has been reached.

In de-watering units of this kind it is a problem to maintain the filter media in efficient operating condition by preventing an excessive accumulation of slurry solids on the filter media without necessitating the separation of the filter plates.

This invention relates more specifically to the backwashing of the filter media whereby the separation of the filter plates is avoided.

While this invention is herein shown to be embodied in a unit structurally resembling that of my above mentioned copending application, it is not to be limited by any of the features representing the subject matter of the invention covered by my copending patent application. While the unit is herein shown and spoken of as a stack of horizontal filter plates or elements superposed upon one another, this is not to exclude assemblies in which the filter plates stand vertically and side by side nor should it matter from what end the slurry to be treated enters the unit, nor in a vertical stack of horizontal elements whether the slurry passes downwardly or upwardly therethrough.

It is among the objects of this invention to provide backwash means which are effective, simple, and inexpensive, and which are accessible for inspection and replaceable substantially without dismantling the unit.

In principle these objects are attained by way of providing a slurry feed conduit which under pressure of the feed slurry distends to seal off backwash outlet passages, whereas upon flow reversal during backwashing the conduit by collapsing provides backwash discharge openings for the slurry chamber or chambers. Means are provided to prevent backwash water entering the filtrate chambers and passing through the filter media into the slurry chambers from backing up into the slurry feed conduit.

According to one feature a collapsible feed conduit or tube extends directly through and transversely of the filter plates, that is, the conduit extends substantially at right angles to the plates or the filter media.

According to another feature the collapsible conduit leads upwardly through a stack of horizontal filter plates, whereby the slurry enters at the bottom of the unit or stack and leaves the conduit at the top to enter the topmost slurry chamber for passage through a succession of subsequent slurry chambers.

According to another feature the collapsible conduit transversely penetrating the filter plates has a flow check at the point where the feed slurry passes from the conduit into the first slurry chamber for preventing backwash water from entering the slurry feed conduit.

According to another feature the collapsible conduit penetrating a stack of filter plates has a flow check in the nature of a flap at its outlet end.

According to another feature the slurry de-watering unit is operated in a three-stage cycle, namely, (a) passing slurry through the unit for de-watering whereby the collapsible conduit is distended, (b) backwashing the unit with a reverse flow of water and freeing the filter media in passing therethrough into the slurry chambers, and then passing out directly from the slurry chambers due to collapsing of the feed conduit, and (c) passing sluice or flush water through the collapsible conduit in the slurry feed direction whereby the conduit is again distended and sluice water is forced through a succession of slurry chambers thus flushing the slurry side of the filter media and the slurry chambers free of undesirable solids.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 shows the general external view in perspective of a slurry filter or de-waterer comprising a stack of horizontal filter plates, along with accessible pipe valves, pumps, and tanks.

Fig. 1ª shows in detail one of the anchoring rods used in the filter assembly shown in Fig. 1.

Fig. 2 is a vertical section partially diagrammatic through the filter unit taken along the line 2—2 in Fig. 12, and showing the condition where the collapsible slurry feed conduit is in the distended condition as the slurry is being dewatered.

Fig. 3 is a vertical section similar to that in Fig. 2, however indicating the backwashing phase when the collapsible slurry feed conduit is in the collapsed condition.

Fig. 4 is again a vertical section similar to that in Figs. 2 and 3, however indicating the flushing or sluicing phase where the slurry feed conduit is again in its distended condition.

Fig. 5 is an enlarged sectional detail of a check valve or flap as taken from Figs. 2, 3, or 4, which flap is provided at the upper end of the collapsible slurry feed conduit.

Fig. 6 is a plan view of the check valve or flap shown in Fig. 5.

Figs. 7, 8 and 9 are detail views of a filter plate, Fig. 7 being a bottom view showing the filtrate side, Fig. 8 being a top view showing the slurry side, and Fig. 9 being a longitudinal section along line 9—9 in Fig. 8.

Fig. 10 is a cross-section along line 10—10 taken upon Fig. 9.

Fig. 11 is a cross-section along line 11—11 upon Fig. 9.

Fig. 12 is a top view upon the filter unit.

Figs. 13 to 17 are cross-sections of the filter unit taken upon Fig. 2 along the lines 13—13, 14—14, 15—15, 16—16, 17—17 respectively.

Figs. 18 and 19 are perspective views of a filter element or plate from the top and from the bottom respectively.

The filter or thickening or de-watering apparatus along with accessory equipment as shown in the perspective view of Fig. 1 comprises the filter unit 10 proper, a slurry supply tank 11, a wash-water supply tank 12, a feed pump 13 with drive motor 14, a receiver tank 15 for treated or thickened slurry, and a slurry recirculating pump 16 with drive motor 17.

Referring to Fig. 1 as well as to Figs. 2, 3 and 4, a discharge pipe 18 leads from the slurry tank 11 to a T-pipe fitting 19 and is provided with a control or shut-off valve 20. From the wash-water tank 12 a discharge pipe 21 also leads to the T-pipe fitting 19 and is provided with a control or shut-off valve 22. From the T-pipe fitting 19 a pipe 23 leads to the intake side of feed pump 13. From the discharge side of pump 13 a pipe 23ª leads to a T-pipe fitting 24 which has a short straight fitting 25 connecting it with a shut-off or control valve 26 connecting with pipe 26ª leading to the feed intake at the bottom of the filter unit 10.

The T-pipe fitting 24 connects with an elbow pipe 27 leading into a control or shut-off valve 28 connecting with a straight pipe fitting 27ª leading into cross-fitting 28ª which in turn connects with a pair of pipes 29 and 30 leading to the respective ends of the filter unit 10 at the bottom thereof. A discharge pipe 31 also leads from the cross-pipe fitting and is provided with a shut-off valve 32. From the bottom of the filter unit 10 furthermore leads a pipe 33 to the receiver tank 15, the pipe 33 being provided with a control or shut-off valve 33ª. A discharge connection 34 leads from the receiver tank 15 to the intake side of pump 16 the discharge side of which connects with a riser pipe 35 emptying into the slurry tank 11. A slurry supply for the tank 11 is by way of a supply pipe 36 provided with a shut-off valve 37.

The filter unit 10 is shown to comprise a base plate 38 supported upon transverse beams 39 and 40, a stack of horizontal filter plates 41, a top plate 42, and anchoring or tie rods 43 (see also detail Fig. 1ª) whereby the base plate 38, the filter plates 41, and the top plate 42 are clamped together. The tie rod 43 has a hook shaped lower end portion 43ª, a straight threaded upper end portion 43ᵇ, and a nut 43ᶜ engaging the threaded end portion.

Referring to Figs. 2, 3 and 4, as well as to Figs. 7 to 19, the filter unit 10 will now be described in detail as follows:

In the assembly of the filter unit 10 the stack of filter plates comprises a stack of identical filter plates 41ª, an additional odd plate 44 at the bottom, another odd plate 45 on top of the filter plates 41ª, and on top of that still another plate 45ª; that is, the odd plate 44 is interposed between the lowest of the filter plates 41ª and the base plate 35, while the other two odd plates 45 and 45ª are interposed between the highest of the filter plates 41ª and the top plate 42.

When assembled in the unit 10 the filter plates form slurry chambers 46 recognizable in the drawings by undulating surfaces and extending substantially from end to end of the unit. In this assembly the filter plates also form filtrate chambers 47ª and 47ᵇ each extending substantially only through one half of the unit. Each slurry chamber is separated from its associated filtrate chamber by a substantially plane filter medium 48.

At the bottom center the filter unit has an intake 49 for slurry feed or sluice water as the case may be, which intake continues as a vertical conduit 50 upwardly in the form of a collapsible tube 51 penetrating the plates 44, 41ª, and 45, terminating in and being fixed to the plate 45. The upper end of the vertical conduit 50 is provided with a check valve 52 shown to be in the form of a flap of pliable material. A suitably shaped recess in the underside of the plate 45ª constitutes a transfer conduit 53 leading from the checkvalve 52 horizontally to a vertical port 54 in plate 45 connecting with the first slurry chamber 46 at one end thereof. At the opposite end this slurry chamber connects with a port 55 provided in the topmost of the filter plates 41ª and leading to the next lower slurry chamber 46. In a similar manner the slurry stream continues through the next following lower slurry chamber 46, reversing its horizontal flow direction as it passes from one slurry chamber into the next, finally to reach a port 55ª in plates 44 and 35, leading into pipe 33 discharging the de-watered or thickened slurry into the receiver tank 15.

It will be observed that the stacked filter plates 41ª are identical as individual structures, but that in assembly they are reversed in alternation, that is, one plate 41ª has its port 55 at one end of the unit 10 while the next following plate 41ª is endwise reversed so that its port 55 appears at the opposite end of the unit 10. Due to this arrangement the slurry passes in zig-zag fashion downwardly through the filter unit 10 as liquid is being abstracted from the slurry through the filter media 48 into the respective filter chambers 47ª and 47ᵇ.

This alternating endwise reversal of the filter plates 41ª is apparent also in the respective sections 15—15 and 16—16 of the filter unit 10, as shown in Figs. 15 and 16.

In the one group of superposed filtrate chambers 47ª and 47ᵇ each chamber has a vertical discharge port, such as a port 56 in plate 45 and ports 57 and 58 in each plate 41ª, all the vertical ports 56, 57 and 63 lining up to form a vertical filtrate discharge conduit 58 which also includes a vertical port 59 in the odd plate 44 and a similar port 60 in the base plate 35, leading into pipe 30. The port 56 in plate 45 connects with its filtrate chamber 47ª by way of an inclined branch port 60ª, while the port 57 in plate 41ª connects with its associated filtrate chamber by a similar inclined branch port 61.

In the opposite group of superposed filtrate chambers 47ª and 47ᵇ the outer end of each chamber has a vertical discharge port, such as a port 62 in plate 45 and ports 57 and 63 in each plate 41ª, all the vertical ports 62, 57 and 63 lining up to form a vertical filtrate discharge conduit 64 which also includes a vertical port 65 in the odd plate 44 and a similar port 66 in the base plate 35, leading into pipe 29. The port 62 in plate 45 connects with its filtrate chamber 47ᵇ by way of an inclined branch port 67, while the port 63 in plate 41ª connects with its associated filtrate chamber by a similar inclined branch port 68.

The odd plate 44 has a bottom recess 69 for discharging backwash water in a manner to be described further below. This recess 69 constitutes a horizontal transfer connection leading to a vertical port 70 in base plate 35, which in turn connects with a discharge pipe 71.

Further details of the odd plates 44 and 45, and of the filter plates 45ª will now be described by reference to Figs. 14 to 19. The odd plate 44 (see Fig. 17) has a dividing ridge 72 extending medially of the slurry chamber and dividing the same into two longitudinal sections, but terminating just short of the slurry outlet port 55ª, and interrupted by a central opening 73 to accommodate the collapsible tube 51 constituting the vertical feed conduit 50.

The odd plate 45 (see Fig. 14) is provided at its top side with a transverse groove 74 (see also Figs. 5 and 6). The filter medium 48 overlying the odd plate 45 serves here merely as a gasket. The flap 52 is fastened in groove 74 by means of a wedge member 75. The plate 45 has a central opening 76 which is overlain by the flap 52 and through which extends the upper end portion of the collapsible tube 51. Surrounding the opening 76 on the upper side of plate 45 is an annular recess 77 in which is fastened the upper outwardly flaring end of the collapsible tube 51.

The filter plate 41ª (see Figs. 7 to 11 and 15, 16) has a medial ridge 77ª dividing the slurry chamber, although interrupted by an opening 78 for accommodating the collapsible tube 51. The underside of this filter plate has a pair of large shallow recesses constituting the filtrate chambers 47ª and 47ᵇ.

The chamber 47ᵇ is of somewhat greater length than chamber 47ª as is indicated by their respective dimensions $a$ and $b$ (see Fig. 7). In fact the length $a$ is shorter than the length $b$ by the differential $c$ which is occupied by the pair of ports 55, such ports being provided only at one end of each filter plate 41ª. The underside of plate 41ª furthermore has a pair of transverse narrow recesses or grooves 79 straddling the opening 78, into which grooves is fastened the filter medium 48 by means of wedge members 80. It will be observed that each of the odd plates 44 and 45 as well as each of the filter plates 41ª is provided with this identical means of fastening the filter medium to the underside of the respective plates. It is also noted that each of the shallow recesses constituting filtrate chambers have longitudinal flow directing ridges, the chambers 47ª having such ridges designated by the numeral 81 terminating at a transverse collecting groove 82 from which extends a branch groove 83 leading into the inclined branch port 60 and thus into the vertical port 63. Flow directing ridges 84 in the filtrate chamber 47ᵇ terminate at a transverse collecting groove 85 from which the inclined branch port 61 leads into the vertical port 57. The upper side of each of the plates constituting the filter unit 10 excepting the top plate 42 has a pair of dowel pins 86, one at each end, its location being defined by the dimensions $x$ and $y$ (as shown in Figs. 7 and 8). The underside of each plate excepting the base plate 35 has corresponding holes 87 to match and receive the dowel pins 86 and therefore also defined by the dimensions $x$ and $y$.

*Operation*

For the purpose of abstracting liquid from the slurry in the filter unit 10, the valves 20, 26, and 33ª as for slurry passage, as well as the valve 32 for filtrate passage are open, while the valves 22 and 28 are closed. Consequently as the feed pump 13 operates (see Fig. 2) slurry from supply tank 11 passes through pipe 18, T-pipe fitting 19, pipe 23, into pump 13 which forces it through pipe 23ª, fittings 24 and 25, valve 26, pipe 26ª to inlet 49 and hence up into and through the vertical conduit 50 within the filter unit 10, the pressure of the slurry within the collapsible tube 51 causing the same to expand sufficiently to seal the openings 78 in the filter plates 41ª as well as the opening 73 in the odd plate 44 against the slurry chambers 46. The slurry is thus forced past the check valve or flap 52, through the transfer conduit 53 and port 54 into topmost slurry chamber 46 at one end thereof. The slurry passes on over the undulating bottom face of the slurry chamber in direction of the arrows while liquid is being abstracted upwardly from the slurry stream through the filter medium 48. The slurry having thus lost some of its liquid content reaches the opposite end of this slurry chamber 46 where it passes downwardly through ports 55 into the adjacent end portion of the next lower slurry chamber 46. Then reversing its horizontal flow direction the slurry passes on to the opposite end of this slurry chamber while additional liquid is being abstracted through the associated filter medium 48. In this manner the slurry continues from one slurry chamber to the next until it reaches the outlet port 55ª at the end of the lowest slurry chamber 46, whence the thus de-watered or thickened slurry passes through valve 33ª in discharge pipe 33 into the receiver tank 15, to be passed out of the system as by way of a valved outlet connection 88 if the slurry has been sufficiently thickened by a single passage through the unit 10, or to be sent back through recirculating pump 16 and riser pipe 35 into the surry tank 11 for additional de-watering and repeated passage through the filter unit 10. That is the operation may be either by continuous straight passage of fresh slurry through the filter unit, or it may be batchwise by recirculation of slurry until a desired degree of de-watering has been reached, or it may be a combination of straight and recirculation operation.

The path of the filtrate entering the filtrate chambers is by way of the inclined ports 61 and 68 at the respective outer end of the filtrate chambers into the respective vertical conduits 58 and 64 and through the respective discharge pipes 29, 30, and 31 by way of the discharge valve 32.

After a certain period of slurry filtration operation it may be desirable to backwash the filter media 48. To this end (see Fig. 3) the feed of slurry from tank 11 is discontinued and feed of wash-water from tank 12 is started into the filter unit 10; that is to say, the valves 20, 26 and 32 are closed, while valves 22 and 28 are opened. The pump 13 now forces wash-water from tank 12 through fitting 25, elbow 27, and valve 28 into the branch pipes 29 and 30 in a direction opposite to the previous flow of filtrate therethrough. The wash water thus rises through the vertical conduits 58 and 64 at each end of the filter unit 10, and through the inclined branch ports 61 and 68 simultaneously into all the filtrate chambers 47ª and 47ᵇ. Thence it seeps or is forced through the filter media 48 into respective slurry chambers 46 from each of which it escapes directly by way of the openings 78 which now offer wash water effluent passages due to the collapsing of the vertical feed tube 51. The tube 51 collapses because of the exterior pressure thereon from the wash-water and due to the absence of the interior pressure which prevails only while slurry is being fed through the tube 51 by pump 13. The effluent wash-water thus collects from all chambers and reaches the opening 73 in plate 44, thence by way of transfer passage 69 to flow through port 70 into the backwash effluent discharge pipe 71.

Wash-water passing from the topmost filtrate chamber 47ª through filter medium 48 into the topmost slurry chamber 46 may then back up through the port 54 into the transfer conduit 53, but is stopped from entering the collapsible tube 51 and passing into the slurry feed conduit by the check valve or flap 52. This checking action of the flap 52 therefore prevents the building up of such internal pressure in the tube 51 as might counteract the collapsing of the tube 51 during the backwash phase of the operation.

The backwashing done, it may be desirable as a part of the operating cycle to pass a flow of sluice water through the unit in the slurry flow direction to remove or flush or sluice out accumulated solids which may have remained in the slurry chamber from the preceding backwashing step. To this end (see Fig. 4) the wash-water valve 22 is left open, and valves 26, 32 and 33ª are opened while valve 28 is closed. Consequently the pump 13 sends sluice water into and through the filter unit 10 along the slurry flow path as defined above.

Following this the feed may be switched from the wash-water supply tank 12 back to the slurry supply tank 11 by closing the valve 22 and opening the valve 20, and normal slurry filtration operation thus may be resumed.

I claim:

1. As an article of manufacture in a de-watering unit a horizontal plate of greater length than width and having an upper side comprising a slurry chamber in the form of a shallow recess in said plate and extending substantially the length of said plate, and having a lower side comprising a pair of filtrate chambers in the form of shallow recesses in area substantially corresponding to said slurry chamber recess except for a raised central portion of the plate separating the filtrate chamber recesses, said central raised portion having a central port opening, said slurry chamber having a discharge port at one end of the plate, said filtrate chambers each having a port at the respective ends of the plate.

2. A slurry thickener unit comprising an upper plate formed at its underside with a filtrate chamber, a lower adjoining plate formed at its upper side with a slurry chamber, a filter medium interposed between said plates and separating the slurry chamber from the filtrate chamber, tie means for maintaining said plates and said filter medium in cooperative assembly, said upper plate having a filtrate outlet passage adapted to serve also as a wash-water inlet passage, said lower plate having a slurry receiving end and a slurry outlet passage at the opposite end whereby slurry passes horizontally from the one end to the other end of the chamber, a slurry feed conduit leading to said slurry receiving end, a discharge conduit for thickened slurry leading from said slurry outlet passage, each of said plates further having a wash-water passage opening, which openings register with each other to constitute a vertical wash-water discharge passage extending through and at right angles to the plates and the filter medium, said wash-water passage having a connection with said slurry chamber for receiving therefrom spent wash-water adapted to pass from the filtrate chamber through the filter medium into the slurry chamber, a wash-water disposal conduit leading from the lower end of said vertical wash-water discharge passage, an internal feed conduit portion extending within and along said wash-water passage, slurry supply conduit means leading to the lower portion of said slurry feed conduit portion, slurry transfer conduit means leading from the upper portion of the internal feed conduit portion to the inlet of said slurry chamber, said internal feed conduit portion being of a non-rigid material rendering it distendable as well as collapsible, said internal feed conduit portion being distended by said feed slurry being passed therethrough and being collapsed when the flow of feed slurry therethrough has been stopped and wash-water is being fed into the filtrate chambers by way of said filtrate passage and in a direction reverse to the preceding flow of filtrate, the spent wash water thus being allowed to pass through said vertical wash-water discharge passage and said wash-water disposal conduit.

3. A slurry thickener according to claim 2, in which said wash-water discharge conduit and said collapsible slurry feed conduit extend substantially centrally through said plates.

4. A slurry thickener according to claim 2, with the addition of one-way flow check means for preventing back-flow through said slurry feed conduit.

5. A slurry thickener according to claim 2, with the addition that a check valve in the nature of a flexible flap is provided at the top of said collapsible feed conduit preventing back-flow therethrough.

HAROLD A. TEALE.

REFERENCES CITED

The following references are of record in the file of this patent:

UNITED STATES PATENTS

| Number | Name | Date |
|---|---|---|
| 2,364,366 | Jahreis | Dec. 5, 1944 |

FOREIGN PATENTS

| Number | Country | Date |
|---|---|---|
| 234,739 | British | June 4, 1925 |